(12) United States Patent
Ohura et al.

(10) Patent No.: US 6,506,489 B1
(45) Date of Patent: Jan. 14, 2003

(54) DOUBLE-FACED PRESSURE-SENSITIVE ADHESIVE SHEET AND PRESSURE-SENSITIVE ADHESIVE MEMBER

(75) Inventors: Masahiro Ohura, Osaka (JP); Hitoshi Takahira, Osaka (JP)

(73) Assignee: Nitto Denko Corporation, Osaka (JP)

( * ) Notice: Subject to any disclaimer, the term of this patent is extended or adjusted under 35 U.S.C. 154(b) by 141 days.

(21) Appl. No.: 09/594,017

(22) Filed: Jun. 15, 2000

(30) Foreign Application Priority Data

Jun. 16, 1999 (JP) .......................................... 11-170356

(51) Int. Cl.[7] .......................... B32B 15/04; B32B 7/12; C09J 7/02
(52) U.S. Cl. ..................... 428/343; 428/40.1; 428/41.8; 428/352; 428/354; 428/208; 428/208.4
(58) Field of Search ................................ 428/343, 41.8, 428/40.1, 352, 354; 427/208, 208.4

(56) References Cited

U.S. PATENT DOCUMENTS

| | | | | |
|---|---|---|---|---|
| 2,822,290 A | * | 2/1958 | Webber | |
| 4,778,703 A | * | 10/1988 | Fontanilla | 428/40 |
| 5,167,995 A | * | 12/1992 | Johnson et al. | 428/40 |
| 5,268,228 A | * | 12/1993 | Orr | 428/343 |
| 5,817,386 A | | 10/1998 | Adamko et al. | 428/41.3 |
| 6,093,464 A | * | 7/2000 | Tokunaga et al. | 428/40.1 |
| 6,258,427 B1 | * | 7/2001 | Kerins et al. | 428/41.8 |

FOREIGN PATENT DOCUMENTS

| | | | |
|---|---|---|---|
| EP | 0 519 086 B1 | 12/1992 | |
| WO | 95/20635 | 8/1995 | ............. C09J/7/02 |

OTHER PUBLICATIONS

Abstract—JP 11–029754 A (Feb. 2, 1999).
Abstract—JP 11–029751 A (Feb. 2, 1999).
Abstract—JP 11–092720 A (Apr. 6, 1999).
Abstract—JP 01–304166 A (Dec. 7, 1989).
European Search Report dated Apr. 19, 2002.

* cited by examiner

*Primary Examiner*—Daniel Zirker
*Assistant Examiner*—Victor S. Chang
(74) *Attorney, Agent, or Firm*—Sughrue Mion, PLLC

(57) ABSTRACT

A doublefaced pressure-sensitive adhesive sheet including an inner pressure-sensitive adhesive layer is provided. The adhesive layer includes an outer silicone-series release liner and an outer non-silicon-series release liner on the opposite side of the sheet from the silicone-series release liner. The non-silicone-series release liner includes a plastic film having at least three layers, wherein the plastic film including a releasing layer which is a surface layer including a polyethylene film, a surface film layer which is the other surface layer and is equal in coefficient of linear thermal expansion to the releasing layer, and a reinforcing layer having a melting point of 120° C. or higher as an interlayer.

3 Claims, 1 Drawing Sheet

DOUBLE-FACED PRESSURE-SENSITIVE ADHESIVE SHEET AND PRESSURE-SENSITIVE ADHESIVE MEMBER

FIELD OF THE INVENTION

The present invention relates to a double-faced pressure-sensitive adhesive sheet and a pressure-sensitive adhesive member. More particularly, the invention relates to a double-faced pressure-sensitive adhesive sheet and a pressure-sensitive adhesive member which are suitable for use in applications such as the assembly of electronic appliances where contamination with a silicone should be avoided, e.g., magnetic recording apparatus (a hard disk drive (HDD)).

BACKGROUND OF THE INVENTION

Pressure-sensitive adhesive sheets for use in the bonding of various articles have a release liner superposed on a surface of the pressure-sensitive adhesive layer for the purpose of protecting the pressure-sensitive adhesive layer until use. Generally used as such release liners are release sheets obtained by coating a base material, e.g., paper or a plastic film, with a silicone-series release agent.

On the other hand, double-faced adhesive sheets (tapes) among such pressure-sensitive adhesive sheets have recently come to be used also in the assembly of precision electronic parts (appliances) for, e.g., magnetic recording apparatus (HDD). In this case, a double-faced pressure-sensitive adhesive sheet is frequently used as a pressure-sensitive adhesive member obtained by stripping off one of the release liners with which both sides of the pressure-sensitive adhesive layer are covered and bonding a base material suitable for the intended use to the exposed surface of the pressure-sensitive adhesive layer.

In such applications, there is a desire to exclude any silicone-series material from the components of pressure-sensitive adhesive sheets in order to prevent contact failures and head crush troubles in magnetic disks. Among the components of pressure-sensitive adhesive sheets, those for which a silicone-series material is frequently used are release liners or the like. Namely, a silicone-series release agent is frequently used as a release agent for the release liners. Consequently, the most effective measure in satisfying that desire is not to use a silicone-series release agent.

Possible methods for avoiding the use of a silicone-series release agent include a method in which a fluorine-series release agent or a long-chain alkyl type release agent is used for release liners and a method in which polyolefin-series plastic films having poor adhesiveness, e.g., polyethylene or polypropylene, are used as release liners. However, use of a fluorine-series release agent in producing release liners to be used respectively for covering both sides of a double-faced adhesive sheet has a problem that the production cost is increased because the release agent is expensive. On the other hand, use of a long-chain alkyl type release agent in the above application has a drawback that the releasing force required for release liner stripping is higher than in the case of silicone-series release agents and this tends to result in reduced workability when one of the release liners is stripped off and the pressure-sensitive adhesive layer is applied to any of various base materials to produce a pressure-sensitive adhesive member. Furthermore, use of a polyolefin-series plastic film as a release liner tends to pose a problem concerning heat resistance, although it has been found that a release liner having low releasing force (excellent releasability) is obtainable depending on the composition of the plastic film. For example, in the case where a pressure-sensitive adhesive layer is formed on such a release liner through heat curing, there is a problem that the release liner curls during the heating, making it difficult to maintain the original sheet form or making it impossible to maintain the appearance quality of the double-faced adhesive sheet.

SUMMARY OF THE INVENTION

Consequently, an object of the invention is to provide a double-faced pressure-sensitive adhesive sheet which has excellent workability when one of the release liners of the double-faced adhesive sheet is stripped off and the exposed surface of the adhesive sheet is bonded to a base material to produce a pressure-sensitive adhesive member, and which does not cause silicone ingredient migration to adherends when used as the pressure-sensitive adhesive member in the assembly of, e.g., precision electronic parts for HDDs.

Another object of the invention is to provide a double-faced pressure-sensitive adhesive sheet which is prevented from curling even when produced through a heating step and which can be produced at low cost.

Still another object of the invention is to provide a pressure-sensitive adhesive member which can be easily and efficiently produced and does not cause silicone ingredient migration to adherends.

The present inventors made intensive studies in order to accomplish those objects. As a result, they have found that when a specific combination of release liners is used as the release liners respectively on both sides of a double-faced pressure-sensitive adhesive sheet, not only this double-faced adhesive sheet can have increased workability when used in producing a pressure-sensitive adhesive member therefrom, but also the pressure-sensitive adhesive member, even when used in the assembly of electronic parts or other products, does not cause the migration of a silicone ingredient to the electronic parts, etc. and thereby prevents contact failures or other troubles. The invention has thus been completed.

The invention provides a double-faced pressure-sensitive adhesive sheet comprising a pressure-sensitive adhesive layer which is covered on one side with a silicone-series release liner and on the other side with a non-silicone-series release liner. The non-silicone-series release liner can be constituted, for example, of a plastic film having a laminated structure composed of at least three layers.

The invention further provides a pressure-sensitive adhesive member obtained by stripping off the silicone-series release liner of the double-faced pressure-sensitive adhesive sheet and bonding a base material to the exposed surface of the pressure-sensitive adhesive layer. This pressure-sensitive adhesive member can be used as an adhesive member for assembling the hard disk drive of a computer.

The term "adhesive sheet" as used herein includes "adhesive tape".

Figure 1:
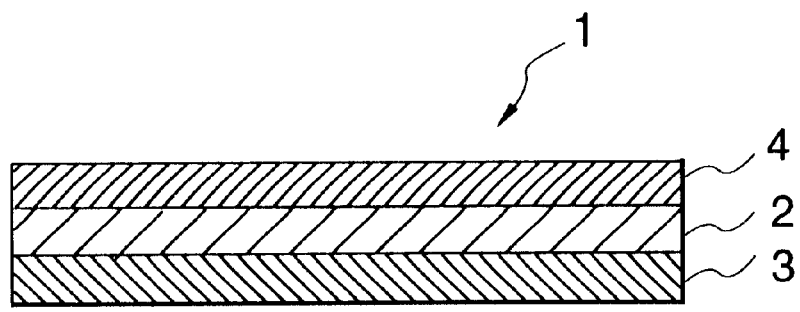
FIG. 1 is a diagrammatic sectional view illustrating one embodiment of the double-faced pressure-sensitive adhesive sheet of the invention.

The symbols described in FIG. 1, 2 or 3 will hereinafter explained.

1: double-faced pressure-sensitive adhesive sheet
2: pressure-sensitive adhesive layer
3: silicone-series release liner
4: non-silicone-series release liner
5: releasing layer
6: reinforcing layer
7: surface film layer
8: base material
10: pressure-sensitive adhesive member

DETAILED DESCRIPTION OF THE INVENTION

Modes for carrying out the invention will be explained below by reference to the drawings according to need.

DOUBLE-FACED PRESSURE-SENSITIVE ADHESIVE SHEET

FIG. 1 is a diagrammatic sectional view illustrating one embodiment of the double-faced pressure-sensitive adhesive sheet of the invention. This double-faced pressure-sensitive adhesive sheet 1 comprises a pressure-sensitive adhesive layer 2 covered on one side with a silicone-series release liner 3 and on the other side with a non-silicone-series release liner 4.

The silicone-series release liner 3 may be a known or ordinarily used release liner. For example, use can be made of a release sheet obtained by applying a silicone-series release agent to a substrate such as, e.g., a paper or a plastic film made of a polymer such as a polyester (e.g., poly (ethylene terephthalate)) or an olefin-series resin (e.g., polyethylene or polypropylene). Preferred as the substrate is a polyester film because it has high heat resistance and is less apt to generate dust particles. Although the silicone-series release agent can be any of the condensation type, addition type, and other types without particular limitations, it is preferred to use a silicone-series release agent which is less apt to cause silicone ingredient migration to the surface of the pressure-sensitive adhesive layer.

The silicone-series release liner 3 can have a thickness suitably selected so as not to impair strength, handleability, etc. However, the thickness thereof is usually about from 20 to 200 μm.

The non-silicone-series release liner 4 is not particularly limited as long as it is a film or sheet which does not contain any silicone-series ingredient, e.g., a silicone-series release agent, and has releasability. Examples thereof include (i) a sheet obtained by applying a fluorine-series release agent or long-chain alkyl type release agent to a substrate such as, e.g., a paper or a film of a plastic comprising a polymer such as a polyester (e.g., poly(ethylene terephthalate)) or an olefin-series resin (e.g., polyethylene or polypropylene) and (ii) a plastic film having poor adhesiveness, e.g., a plastic film made of a polymer such as an olefin-series resin, e.g., a polyethylene (e.g., linear low-density polyethylene) or polypropylene.

The substrate used in (i) above is preferably a polyester film from the standpoints of heat resistance and dusting prevention. The fluorine-series release agent and the long-chain alkyl type release agent each can be a known or ordinarily used release agent.

In the case where the non-silicone-series release liner 4 is constituted of the plastic film having poor adhesiveness (ii), this plastic film preferably has a laminated structure composed of at least three layers. This structure enables the film to combine releasability with heat resistance (anticurl properties in high-temperature storage, etc.) and strength.

Figure 2:
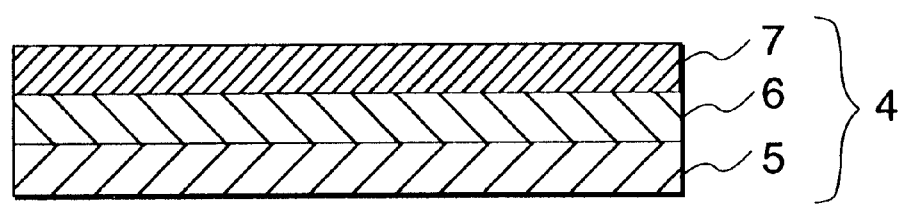
FIG. 2 is a diagrammatic sectional view illustrating one example of the non-silicone-series release liner as a component of the double-faced pressure-sensitive adhesive sheet shown in FIG. 1.

FIG. 2 is a diagrammatic sectional view illustrating an example of the non-silicone-series release liner 4 constituted of such a multilayered plastic film. This non-silicone-series release liner 4 is constituted of a three-layer plastic film composed of a releasing layer 5 as a surface layer, a surface film layer 7 as the other surface layer, and a reinforcing layer 6 interposed between these surface layers.

The releasing layer 5 can be constituted of a polymer having excellent releasability. An example thereof is a polyethylene film (especially, a film of linear low-density polyethylene). The polyethylene film has a density of preferably about from 0.88 to 0.92 g/cm$^3$, more preferably about from 0.89 to 0.90 g/cm$^3$, and a melt index of preferably about 10 g/10 min or lower, more preferably about from 1 to 5 g/10 min. Densities thereof lower than 0.88 g/cm$^3$ tend to result in reduced heat resistance, while densities thereof exceeding 0.92 g/cm$^3$ tend to result in increased releasing force (e.g., 2N/50 mm or more). Furthermore, melt indexes thereof exceeding 10 g/10 min may result in difficulties in sheet forming. In the present invention, the density and melt index (at 190° C. and a load of 2.16 kg) of the releasing layer are values as measured in accordance with JIS K 7112 and JIS K 7210, respectively.

The thickness of the releasing layer 5 is, for example, from 2 to 100 μm, and is preferably about from 5 to 60 μm.

The surface film layer 7 as the other surface layer (outermost layer) preferably is equal in coefficient of linear thermal expansion to the releasing layer 5. The term "equal" as used herein means that the coefficient of linear thermal expansion of the surface film layer 7 is, for example, within the range of about ±50% of that of the releasing layer 5. The coefficient of linear thermal expansion of the surface film layer 7 is within the range of preferably ±30%, more preferably ±25%, of that of the releasing layer 5. In case where the coefficient of linear thermal expansion of the surface film layer 7 considerably differs from that of the releasing layer 5, thermal curling is apt to occur. In the present invention, the coefficient of linear thermal expansion is the value as measured in accordance with JIS K 7197.

The surface film layer 7 is constituted of a plastic film. Examples of this plastic film include films made of an olefin-series resin such as a polyethylene (especially, linear low-density polyethylene), polypropylene, or a polypropylene/SEBS (styrene-ethylene/butylene-styrene block copolymer) copolymer or of a polymer blend containing an olefin-series resin. The thickness of the surface film layer 7 is, for example, from 2 to 100 μm, and is preferably about from 5 to 60 μm.

The reinforcing layer 6 is constituted of a plastic material having high heat resistance and high strength. For example, the melting point of the reinforcing layer 6 is preferably 120° C. or higher, more preferably 130° C. or higher. Examples of the plastic material constituting the reinforcing layer 6 include polyesters and olefin-series resins such as polyethylene, polypropylene, ethylene/propylene copolymers, and ethylene/vinyl acetate copolymers. The reinforcing layer 6 may contain various additives according to need. Examples of the additives include fillers such as titanium white and silica and deterioration inhibitors. In the present invention, the melting point of the reinforcing layer 6 is a value as measured in accordance with JIS K 7121.

The non-silicone-series release liner 4 described above may be composed of four or more layers. For example, the reinforcing layer (interlayer) may be composed of two or more layers. From the standpoint of strength, the release liner is preferably regulated so as to have a modulus of elasticity (23° C.) of 100 kgf/cm² or higher, especially 150 kgf/cm² or higher.

Methods for producing the release liner 4 having such a multilayer structure are not particularly limited, and ordinarily used plastic film laminating methods can be employed, such as the inflation method and the T-die extrusion method.

When the release liner 4 is constituted of a plastic laminate composed of at least three layers and this laminate, for example, has such a constitution that one of the surface layers is a plastic film which has poor adhesiveness and is equal in coefficient of linear thermal expansion to the other surface layer and that a plastic film having high heat resistance and/or high strength is disposed as an interlayer, as described above, then not only this release liner shows excellent releasability even without using a silicone-series material and has high heat resistance and processability but also thermal curling can be prevented even when a heating step is involved in the production or use thereof.

The thickness of the non-silicone-series release liner 4 can be suitably selected as long as strength, handleability, and other properties are not impaired. However, the thickness thereof is generally about from 20 to 200 μm.

The pressure-sensitive adhesive constituting the pressure-sensitive adhesive layer 2 is not particularly limited and can be selected from various pressure-sensitive adhesives including rubber-based adhesives and acrylic adhesives. However, acrylic pressure-sensitive adhesives are especially preferred in that the amount of impurity ions contained therein is small.

An acrylic pressure-sensitive adhesive can be prepared by adding various additives according to need to an acrylic polymer, as the main ingredient, obtained by an ordinary polymerization method. Examples of the additives include crosslinking agents, tackifiers, softeners, antioxidants, and fillers.

As the acrylic polymer is, for example, used a copolymer of a monomer mixture comprising one or more alkyl esters of (meth)acrylic acid as the main component and one or more, copolymerizable, mono-ethylenically unsaturated monomers added thereto according to need. Use of mono-ethylenically unsaturated monomers as comonomers is effective in incorporating functional groups or polar groups to thereby improve or modify heat resistance or adhesiveness.

Examples of the alkyl esters of (meth)acrylic acid include those in which the alkyl moiety has about form 2 to 12 carbon atoms, such as ethyl (meth)acrylate, butyl (meth) acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate, and dodecyl (meth)acrylate. These alkyl esters of (meth)acrylic acid can be used alone or in combination of two or more thereof.

Examples of the mono-ethylenically unsaturated monomers include carboxyl-containing monomers such as acrylic acid and itaconic acid; sulfo-containing monomers such as sulfopropyl (meth)acrylate; hydroxyl-containing monomers such as hydroxyalkyl (meth)acrylates; cyano-containing monomers such as cyanoalkyl (meth)acrylates and acrylonitrile; amido-containing monomers such as acrylamide, substituted acrylamides, and N-vinylcaprolactam; glycidyl-containing monomers such as glycidyl acrylate; alkoxyalkyl (meth)acrylates such as 2-methoxyethyl acrylate; vinyl esters such as vinyl acetate; and styrene-series monomers including styrene. These monomers can be used alone or in combination of two or more thereof according to the purpose of use thereof.

Any desired polymerization method may be suitably used for producing the acrylic polymer. For example, addition polymerization can be conducted, e.g., by the solution polymerization method, emulsion polymerization method, photopolymerization method using electron beams, ultraviolet rays, etc., or a combination of two or more of these.

The pressure-sensitive adhesive layer 2 preferably has a modulus of elasticity as measured at 23° C. in the range of, for example, from $1\times10^4$ to $1\times10^6$ dyn/cm², especially in the range of from $1\times10^5$ to $7\times10^5$ dyn/cm². In case where the modulus of elasticity thereof exceeds $1\times10^6$ dyn/cm², the pressure-sensitive adhesive layer 2 has too weak releasing force, so that the release liners 3 and 4 are apt to peel off by themselves.

In case where the modulus of elasticity thereof is lower than $1\times10^4$ dyn/cm², the pressure-sensitive adhesive layer 2 has too strong releasing force, making it difficult to strip off the release liners 3 and 4.

The thickness of the pressure-sensitive adhesive layer 2 can be suitably selected while taking account of pressure-sensitive adhesiveness, etc. The thickness thereof is, for example, from 1 to 200 μm, and is preferably about from 30 to 150 μm.

The pressure-sensitive adhesive layer 2 may have a multilayer structure comprising a substrate and a pressure-sensitive adhesive layer formed on each side thereof. Examples of this substrate include plastic films made of polymers such as polyesters (e.g., poly(ethylene terephthalate)), polypropylene, polystyrene, and poly(vinyl chloride), metal foils such as aluminum foils and stainless-steel foils, and papers such as kraft paper, woodfree paper, and crepe paper. Although the thickness of the substrate can be suitably selected while taking account of handleability, etc., it is generally about from 5 to 300 μm, preferably about from 30 to 200 μm. A pressure-sensitive adhesive layer having such a substrate as an interlayer can be obtained by applying a pressure-sensitive adhesive to both sides of the substrate, drying the adhesive, and crosslinking the same according to need.

The double-faced pressure-sensitive adhesive sheet of the invention can be produced by an ordinary film laminating method (e.g., coating). For example, the double-faced pressure-sensitive adhesive sheet 1 shown in FIG. 1 can be produced by applying a pressure-sensitive adhesive on the surface of a silicone-series release liner 3, drying and optionally crosslinking the adhesive to form a pressure-sensitive adhesive layer 2, and then bonding a non-silicone-series release liner 4 (the releasing layer 5 side in the case of using a release liner of the multilayer structure described above) to the surface of this pressure-sensitive adhesive layer 2. When the non-silicone-series release liner 4 has high heat resistance, for example, as in the case where the non-silicone-series release liner 4 is constituted of the multilayered plastic laminate described above, then the double-faced pressure-sensitive adhesive sheet 1 can be obtained also by applying a pressure-sensitive adhesive on the surface of the non-silicone-series release liner 4, drying and optionally crosslinking the adhesive to form a pressure-sensitive adhesive layer 2, and then bonding a silicone-series release liner 3 to the surface of this pressure-sensitive adhesive layer 2. When a pressure-sensitive adhesive layer containing a substrate as an interlayer is used, then the double-faced pressure-sensitive adhesive sheet 1 can be obtained by bonding a silicone-series release liner 3 to one side of the pressure-sensitive adhesive layer (adhesive sheet) produced beforehand and bonding a non-silicone-series release liner 4 to the other side of the pressure-sensitive adhesive layer.

Since the double-faced pressure-sensitive adhesive sheet of the invention has an ordinary silicone-series release liner having excellent heat resistance on one side of the pressure-sensitive adhesive layer, not only the cost thereof can be reduced but the following effects can be brought about. For example, even in the case where formation of the pressure-sensitive adhesive layer necessitates high-temperature heating, the pressure-sensitive adhesive layer can be formed on the silicone-series release liner, and subsequently bonding a non-silicone-series release liner to the other side of the thus-formed pressure-sensitive adhesive layer gives the double-faced pressure-sensitive adhesive sheet without causing curling. Moreover, since the silicone-series release liner has exceedingly high releasability, the double-faced pressure-sensitive adhesive sheet has excellent workability when a pressure-sensitive adhesive member is produced therefrom by stripping the release liner from one side of the double-faced pressure-sensitive adhesive sheet and bonding the exposed surface of the pressure-sensitive adhesive layer to a base material suitable for the purpose. Namely, the pressure-sensitive adhesive member can be produced efficiently. In the double-faced pressure-sensitive adhesive sheet of the invention, the other side of the pressure-sensitive adhesive layer is covered with a non-silicone-series release liner. Consequently, stripping this release liner from the pressure-sensitive adhesive member and bonding this pressure-sensitive adhesive member to an adherend through the exposed surface of the pressure-sensitive adhesive layer does not cause silicone ingredient migration to the adherend, because that exposed surface has not been contaminated with any silicone ingredient.

The double-faced pressure-sensitive adhesive sheet of the invention therefore can not only be used as it is as a base material-less pressure-sensitive adhesive sheet having a non-silicone-series release liner on one side, but also be used as a pressure-sensitive adhesive member having a non-silicone-series release liner by stripping off the silicone-series release liner and bonding the exposed surface of the pressure-sensitive adhesive layer to an appropriate base material.

Pressure-Sensitive Adhesive Member

Figure 3:
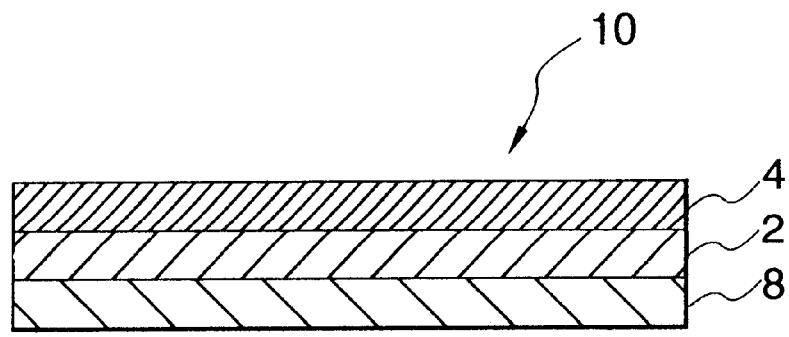
FIG. 3 is a diagrammatic sectional view illustrating one embodiment of the pressure-sensitive adhesive member of the invention.

FIG. 3 is a diagrammatic sectional view illustrating one embodiment of the pressure-sensitive adhesive member of the invention. This pressure-sensitive adhesive member 10 is constituted of a base material 8 and, superposed on the base material 8 in this order, a pressure-sensitive adhesive layer 2 and a non-silicone-series release liner 4.

The base material 8 is not particularly limited and can be suitably selected according to applications. For example, in the case where the pressure-sensitive adhesive member 10 is used in hermetic applications, e.g., for closing openings, in the assembly of an electronic part for, e.g., the hard disk drive of a computer, examples of the base material 8 include metal foils and laminates of a metal foil with a plastic film such as a poly (ethylene terephthalate) film. For use in gaskets or in applications such as vibration damping or sound insulation, examples of the base material 8 include foamed sheets such as urethane foams. In the case where the pressure-sensitive adhesive member 10 is used for labels, the base material 8 can be a paper, plastic film, metal foil, or the like. In the case where the pressure-sensitive adhesive member 10 is used for filters, the base material 8 can be a porous film or the like.

The pressure-sensitive adhesive member 10 can be produced by stripping off the silicone-series release liner 3 of the double-faced pressure-sensitive adhesive sheet 1 of the invention, laminating a base material 8 to the pressure-sensitive adhesive layer 2 on its exposed surface side (the side from which the liner 3 has been stripped off), and optionally subjecting the laminate to punching to obtain the pressure-sensitive adhesive member having an appropriate shape. Since the silicone-series release liner 3 has excellent releasability, the pressure-sensitive adhesive member 10 can be easily produced efficiently.

When this pressure-sensitive adhesive member 10 is applied to an adherend, the non-silicone-series release liner 4 is stripped off and the exposed surface of the pressure-sensitive adhesive layer is bonded to the adherend. Consequently, the adherend is not fouled by a silicone ingredient. Because of this, the pressure-sensitive adhesive member can be used as a silicone-free pressure-sensitive adhesive member in the field of electronic materials where contamination with a silicone should be avoided, especially used for the hard disk drive of a computer.

The double-faced pressure-sensitive adhesive sheet of the invention produces the following effects. Since the adhesive sheet has a constitution in which the pressure-sensitive adhesive layer is covered on one side with an inexpensive silicone-series release liner excellent in heat resistance and releasability and covered on the other side with a non-silicone-series release liner, a pressure-sensitive adhesive member can be easily and efficiently obtained therefrom by stripping off the silicone-series release liner and bonding the exposed surface of the pressure-sensitive adhesive layer to an appropriate base material. In addition, by stripping the non-silicone-series release liner from the resultant pressure-sensitive adhesive member to utilize the exposed surface of the pressure-sensitive adhesive layer, the pressure-sensitive adhesive member can be applied to an adherend without causing silicone ingredient migration to the adherend. Furthermore, the double-faced pressure-sensitive adhesive sheet can be produced at low cost while preventing curling even when a heating step is involved in the production.

Since the pressure-sensitive adhesive member of the invention is produced by stripping off the silicone-series release liner of the double-faced pressure-sensitive adhesive sheet while leaving the other release liner and then bonding a base material to the exposed surface of the pressure-sensitive adhesive layer, the production efficiency is high. In addition, after the non-silicone-series release liner on the other side is peeled off, the exposed surface of the pressure-sensitive adhesive layer can be utilized to bond the pressure-sensitive adhesive member to an adherend. Consequently, the adherend is not fouled by a silicone ingredient.

The invention will be explained below in more detail by reference to Examples, but the invention should not be construed as being limited by these Examples in any way. Hereinafter, all "parts" are by weight.

EXAMPLE 1

A premix was prepared from 70 parts of isooctyl acrylate, 20 parts of butyl acrylate, 10 parts of acrylic acid, and 0.5 part of 2,2-dimethoxyphenylacetophenone (trade name, Irgacure 651; manufactured by Ciba-Geigy Corporation) as a photoinitiator. This premix was partially polymerized by exposing it to ultraviolet rays in a nitrogen atmosphere to thereby obtain a syrup which had a viscosity of about 5,000 cP and was applicable by coating. To 100 parts of this syrup obtained through partial polymerization were added 1 part of tetrabis (methylene-3-(3', 5'-di-t-butyl-4'-hydroxyphenyl)-propionate)methane as a radical chain inhibitor and 0.2 part of trimethylolpropane triacrylate as a crosslinking agent. These ingredients were mixed together to obtain a pressure-sensitive adhesive composition.

The pressure-sensitive adhesive composition obtained above was applied to a silicone-treated poly(ethylene terephthalate) film having a thickness of 50 μm (silicone-series release liner) and then irradiated in a nitrogen atmosphere with ultraviolet rays at 900 mJ/cm$^2$ using a high-pressure mercury lamp having a light intensity of 5 mW/cm$^2$ to photopolymerize the composition and thereby form a pressure-sensitive adhesive layer (layer of the photopolymerization product) having a thickness of 50 μm (modulus of elasticity at 23° C., 6×10$^5$ dyn/cm$^2$). The adhesive layer was dried at 120° C. for 7 minutes in a circulating hot-air drying oven. This pressure-sensitive adhesive layer was laminated to the non-silicone-series release liner obtained by the method described below so that the releasing layer of the liner came into contact with the adhesive layer. Thus, a double-faced pressure-sensitive adhesive tape was produced.

Subsequently, of the two release liners respectively covering both sides of the double-faced pressure-sensitive adhesive tape, the silicone-series release liner was stripped off. An aluminum foil was laminated to the exposed surface of the pressure-sensitive adhesive layer to obtain a pressure-sensitive adhesive member.

Production of Non-Silicone-Series Release Liner

Anon-silicone-series release liner (laminated plastic sheet) was obtained by the T-die extrusion method at 180° C. This release liner was composed of three layers, i.e., a layer of linear low-density polyethylene having a thickness of 15 μm (density, 0.89 g/cm$^3$; melt index, 5 g/10 min; coefficient of linear thermal expansion, 18×10$^{-5}$/° C.) as a releasing layer (the layer to be laminated to the pressure-sensitive adhesive layer) a polypropylene layer having a thickness of 50 μm (melting point, 140° C.) as a reinforcing layer (interlayer), and a layer of linear low-density polyethylene having a thickness of 15 μm (coefficient of linear thermal expansion, 18×10$^{-5}$/°C.) as an outer layer (surface film layer).

EXAMPLE 2

Into a flask were introduced 90 parts of 2-ethylhexyl acrylate, 10 parts of acrylic acid, 210 parts of ethyl acetate, and 0.4 part of 2,2'-azobisisobutyronitrile. After the atmosphere in the flask was sufficiently replaced with nitrogen gas, the contents were stirred at a temperature of from 60 to 80° C. to conduct solution polymerization. Thus, a polymer solution was obtained which had a viscosity of about 120 P and a rate of polymerization of 99.0% by weight. To 100 parts of this solution was added 2 parts of a polyfunctional isocyanate compound as a crosslinking agent. The ingredients were mixed together to obtain a pressure-sensitive adhesive composition.

This pressure-sensitive adhesive composition was applied to a silicone-treated poly(ethylene terephthalate) film having a thickness of 50 μm (silicone-series release liner) and then dried in a circulating hot-air drying oven first at 40° C. for 5 minutes and then at 120° C. for 7 minutes to thereby form a pressure-sensitive adhesive layer (layer of the product of solution polymerization) having a thickness of 50 μm (modulus of elasticity, 2×10$^5$ dyn/cm$^2$). This pressure-sensitive adhesive layer was laminated to the non-silicone-series release liner obtained by the method described below so that the releasing layer of the liner came into contact with the adhesive layer. Thus, a double-faced pressure-sensitive adhesive tape was produced.

Subsequently, of the two release liners respectively covering both sides of the double-faced pressure-sensitive adhesive tape, the silicone-series release liner was stripped off. An aluminum foil was laminated to the exposed surface of the pressure-sensitive adhesive layer to obtain a pressure-sensitive adhesive member.

Production of Non-Silicone-Series Release Liner

A non-silicone-series release liner (laminated plastic sheet) was obtained by the T-die extrusion method at 180° C. This release liner was composed of three layers, i.e., a layer of linear low-density polyethylene having a thickness of 30 μm (density, 0.91 g/cm$^3$; melt index, 2 g/10 min; coefficient of linear thermal expansion, 14×10$^{-5}$/°C.) as a releasing layer (the layer to be laminated to the pressure-sensitive adhesive layer), a polyethylene/propylene copolymer layer having a thickness of 50 μm (melting point, 125° C.) as a reinforcing layer (interlayery, and a polypropylene/SEBS copolymer layer having a thickness of 20 μm (coefficient of linear thermal expansion, 11×10$^{-5}$/°C.) as an outer layer (surface film layer).

COMPARATIVE EXAMPLE 1

A double-faced pressure-sensitive adhesive tape was produced in the same manner as in Example 1, except that a silicone-treated poly(ethylene terephthalate) film (silicone-series release liner) was used in place of the non-silicone-series release liner (laminated plastic sheet).

Subsequently, of the two release liners respectively covering both sides of the double-faced pressure-sensitive adhesive tape, one silicone-series release liner was stripped off. An aluminum foil was laminated to the exposed surface of the pressure-sensitive adhesive layer to obtain a pressure-sensitive adhesive member.

Evaluation Tests

The double-faced pressure-sensitive adhesive tapes obtained in the Examples and Comparative Example were examined and evaluated for the amount of silicone migration to the pressure-sensitive adhesive layer, releasability of a release liner, and curling by the following methods. The results obtained are shown in Table 1.

Amount of Silicone Migration to Pressure-Sensitive Adhesive Layer

Each double-faced pressure-sensitive adhesive tape was allowed tostandin a 40° C. atmosphere for 24 hours. Thereafter, the non-silicone-series release liner (in the Comparative Example, one of the release liners) was stripped off, and the amount (kilo count per second) of a silicone contained in the exposed surface of the pressure-sensitive adhesive layer was determined by fluorescent X-ray spectrometry.

Releasability of Release Liner

Of the two release liners of each double-faced pressure-sensitive adhesive tape, the silicone-series release liner was stripped off by hand. Thereafter, the exposed surface of the pressure-sensitive adhesive layer was applied to an AL (aluminum) plate with a hand roller, and the other release liner was stripped off by hand while examining the releasability of the release liner. The tape was evaluated based on the following criteria.

o: satisfactory.

X: the release liner required greater releasing force (i.e., 2N/50 mm or more).

Curling

A double-faced pressure-sensitive adhesive tape of the A4 size was allowed to stand in a 70° C. atmosphere for 12 hours and then visually examined for curling. The tape was evaluated based on the following criteria.

o: almost no curling was observed.

X: considerable curling had occurred.

TABLE 1

|  | Silicone amount (kcps) | Releasability | Curling |
|---|---|---|---|
| Example 1 | 0.0 | o | o |
| Example 2 | 0.0 | o | o |
| Comparative Example 1 | 0.4 | o | o |

As apparent from the results given in Table 1, the double-faced pressure-sensitive adhesive tapes obtained in the Examples not only underwent no silicone migration to that side of the pressure-sensitive adhesive layer which had been covered with a non-silicone-series release liner, but also were satisfactory in releasability and reduced in curling. Namely, these adhesive tapes had excellent quality characteristics.

While the invention has been described in detail and with reference to specific embodiments thereof, it will be apparent to one skilled in the art that various changes and modifications can be made therein without departing from the spirit and scope thereof.

What is claimed is:

1. A double-faced pressure-sensitive adhesive sheet comprising an tinner pressure-sensitive adhesive layer, an outer silicone-series release liner and an outer non-silicone-series release liner on the opposite side of the sheet from the silicone-series release liner wherein the non-silicone-series release liner comprises a plastic film having at least three layers, wherein said plastic film comprises a releasing layer which is a surface layer comprising a polyethylene film, a surface film layer which is the other surface layer and is equal in coefficient of linear thermal expansion to the releasing layer, and a reinforcing layer having a melting point of 120° C. or higher as an interlayer.

2. A method of forming a pressure-sensitive adhesive member, comprising providing double-faced pressure-sensitive adhesive sheet comprising an inner pressure-sensitive adhesive layer, an outer silicone-series release liner and an outer non-silicone-series release liner on the opposite side of the sheet from the silicone-series release liner, wherein the non-silicone-series release liner comprises a plastic film having at least three layers, wherein said plastic film comprises a releasing layer which is a surface layer comprising a polyethylene film, a surface film layer which is the other surface layer and is equal in coefficient of linear thermal expansion to the releasing layer, and a reinforcing layer having a melting point of 120° C. or higher as an interlayer, removing the silicone-series release liner to expose a surface of the adhesive layer, and bonding a base material to the exposed surface of the adhesive layer.

3. The method of claim 2, wherein the base material is selected from the group consisting of a paper, plastic film or metal foil to be used in a hard disk drive.

* * * * *